United States Patent Office 3,518,317
Patented June 30, 1970

---

3,518,317
PRODUCTION OF SUBSTITUTED PHENOLS
Douglas Shooter and Anthony Howden Jubb, Norton-on-Tees, England, assignors to Imperial Chemical Industries Limited, London, England, a corporation of Great Britain
No Drawing. Filed Apr. 20, 1967, Ser. No. 632,213
Claims priority, application Great Britain, Apr. 21, 1966, 17,495/66
Int. Cl. C07c *39/06*
U.S. Cl. 260—621  7 Claims

ABSTRACT OF THE DISCLOSURE

Phenol or mono-alkylphenols are alkylated with alkyl benzenes (e.g. trimethyl benzenes) using an alumino silicate or metal halide catalyst, to give e.g. cresols.

---

The invention relates to the production of substituted phenols.

According to the invention phenol or a mono-alkyl phenol is alkylated by contacting it at an elevated temperature, with a mono- or poly-alkyl benzene of which the alkyl groups if straight have at most 10 carbon atoms and if branched have at most 4 carbon atoms, in the presence of a phenol alkylation catalyst which comprises an aluminosilicate and/or a metal halide which has an acidic reaction in water.

When a mono-alkyl phenol is used according to the invention it is preferred that the alkyl group should have at most 10 carbon atoms and more preferably it has at most 4 carbon atoms.

The alkyl benzene preferably has at most 4 carbon atoms per alkyl group and more preferably the alkyl groups are methyl groups. It is preferred that the alkyl benzene has three or more alkyl substituents on the benzene ring.

Phenol alkylation catalysts which may be used in the present invention include for example aluminum trichloride, tin chloride, zinc chloride and boron trifluoride, optionally together with a halogen hydracid i.e. HCl, HBr, HI and HF, but it is preferred to use aluminosilicates, preferably of the acidic variety, which may be amorphous or crystalline. Amorphous aluminosilicates, for example of the alumina/silica cracking catalyst type, are suitably activated by treatment with boron trifluoride. An especially preferred class of aluminosilicate catalysts are the crystalline aluminosilicate molecular sieves of which the channel size is about 8 to 13 A., preferably 10 to 13 A. Such molecular sieves are preferably used in their rare earth metal forms, though the group Ia, IIa or IIIa metal forms, especially the sodium and calcium forms, are very effective also.

Many of the halide catalysts, such as aluminum chloride may be used at temperatures in the range of 15 to 100° C. For the alumino silicate catalysts temperatures in the range of 200–500° C. and preferably in the range 300–400° C. may be employed.

The proportions of the reactants to be used according to the invention are not critical, but it is preferred when mono-alkyl phenols are to be produced from phenol to use from 1 to 2 moles of phenol per mole of alkyl benzene and when dialkyl phenols are to be produced from mono-alkyl phenols to use between 1 and 2 moles of the alkyl benzene per mole of mono-alkyl phenol. When the alkyl benzene is a mono-alkyl benzene, it is preferably present in a ratio of at least 2 moles per mole of the phenol or mono-alkyl phenol.

It is preferred that the reaction be carried out in the absence of solvents.

The reaction may be carried out in the liquid or the vapour phase; if it is carried out in the vapour phase, it is preferred that an elevated pressure of at most 50 atmospheres and more preferably at most 10 atmospheres should be employed.

We have found that in general when using crystalline aluminosilicate molecular sieves having a channel size of 10–13 A., the phenol or mono-alkyl phenol is preferentially alkylated in the ortho and para positions thus producing the ortho and para isomers of the product in more than their equilibrium amounts.

EXAMPLES

A mixture of 50% by volume of phenol and 50% by volume of the hydrocarbon shown in the following table, was pumped at a rate of 200 mls. of liquid per hr. through a preheater where it was heated to reaction temperature and then through a catalyst bed of volume 650 mls. consisting of a rare earth metal form of a crystalline aluminosilicate with a channel size of about 13 A., containing 0.7% lanthanium and 1% cerium by weight. The product was condensed, collected and analysed by vapour phase chromatography using a silicone elastomer column.

The temperatures used and product analyses obtained are indicated in the table. The analytical error in the figures is estimated to be about 5% of the figures quoted.

Analysis of the meta/para cresol fraction was carried out by vapour phase chromatography using a column of tri xylenyl phosphate with a small quantity of phosphoric acid, supported on a diatomaceous earth. The ratios of meta cresol to para cresol obtained are indicated in the table.

| Hydrocarbon | Toluene | | | p Xylene | | | 1,2,4-tri methyl benzene | | |
|---|---|---|---|---|---|---|---|---|---|
| Temp., ° C | 300 | 300 | 400 | 300 | 300 | 400 | 250 | 300 | 400 |
| Products wt. percent: | | | | | | | | | |
| Unidentified peaks | | | | | | | 11.6 | 8.4 | 8.8 |
| Benzene | 2.2 | 1.8 | 7.2 | 2.1 | 0.5 | 2.6 | | | |
| Toluene | 48.0 | 44.5 | 42.0 | 4.8 | 5.5 | 7.2 | 1.8 | 0.7 | 0.5 |
| m plus p-xylene | 6.2 | 0.8 | 0.9 | 42.0 | 45.0 | 21.0 | | 0.2 | 1.0 |
| o-xylene | 0.2 | 0.1 | 0.1 | | | 7.8 | 1.9 | 0.8 | 0.6 |
| Mesitylene | | | | | | | 6.3 | 8.2 | 8.4 |
| 1,2,4-trimethyl benzene | | | | 7.5 | 1.2 | 3.0 | 20.9 | 23.0 | 23.5 |
| Hemimellitine | | | | | | | 8.8 | 10.8 | 9.9 |
| Phenol | 41.5 | 51.8 | 46.0 | 32.0 | 43.7 | 51.5 | 33.0 | 47.3 | 41.2 |
| o-cresol | 0.7 | 0.9 | 1.9 | 6.2 | 2.0 | 3.3 | 6.3 | 0.7 | 3.3 |
| m plus p-cresol | 0.9 | 0.7 | 1.9 | 5.8 | 2.3 | 3.3 | 6.4 | 0.7 | 2.2 |
| 2:6 xylenol | | | | | | | 0.5 | | |
| 2:4 xylenol | | | | | | | 2.4 | | 0.6 |
| m-cresol:p-cresol | | | | 3.2 | 2.9 | | 5.4 | 2.17 | 1.6 |

We claim:

1. A process of methylating phenol or a cresol which comprises contacting the phenol or cresol with a mono- or poly-methyl benzene in the presence of a crystalline aluminosilicate molecular sieve having a channel size of 8 to 13 A., said contact being carried out at a temperature of 200° to 500° C.

2. A process as claimed in claim 1 in which the polymethyl benzene has at least 3 methyl substituents on the benzene ring.

3. A process as claimed in claim 1 in which the molecular sieve is in a rare earth form.

4. A process as claimed in claim 2 for the production of mono-methyl phenols in which from 1 to 2 moles of phenol are supplied per mole of polymethyl benzene.

5. A process as claimed in claim 2 for the production of di-methyl phenols in which from 1 to 2 moles of the methyl benzene are supplied per mole of cresol.

6. A process as claimed in claim 2 in which at least 2 moles of a mono-methyl benzene are supplied per mole of the phenol or cresol.

7. A process as claimed in claim 1 which is carried out in the vapour phase at an elevated pressure of at most 50 atmospheres.

References Cited

UNITED STATES PATENTS

| | | | |
|---|---|---|---|
| 1,972,599 | 9/1934 | Perkins et al. | 260—624 |
| 2,403,748 | 7/1946 | Olin. | |
| 2,904,607 | 9/1959 | Mattox et al. | |

OTHER REFERENCES

Venuto et al., Journal of Catalyst, vol. 4, 81–95 (1966).

BERNARD HELFIN, Primary Examiner

W. B. LONE, Assistant Examiner

U.S. Cl. X.R.

260—624